Jan 6, 1931. M. G. KRUEGER 1,787,909
AGRICULTURAL IMPLEMENT
Filed April 13, 1928 5 Sheets-Sheet 2

Inventor
Maurice G. Krueger.
By Hardway & Cathey
Attorneys

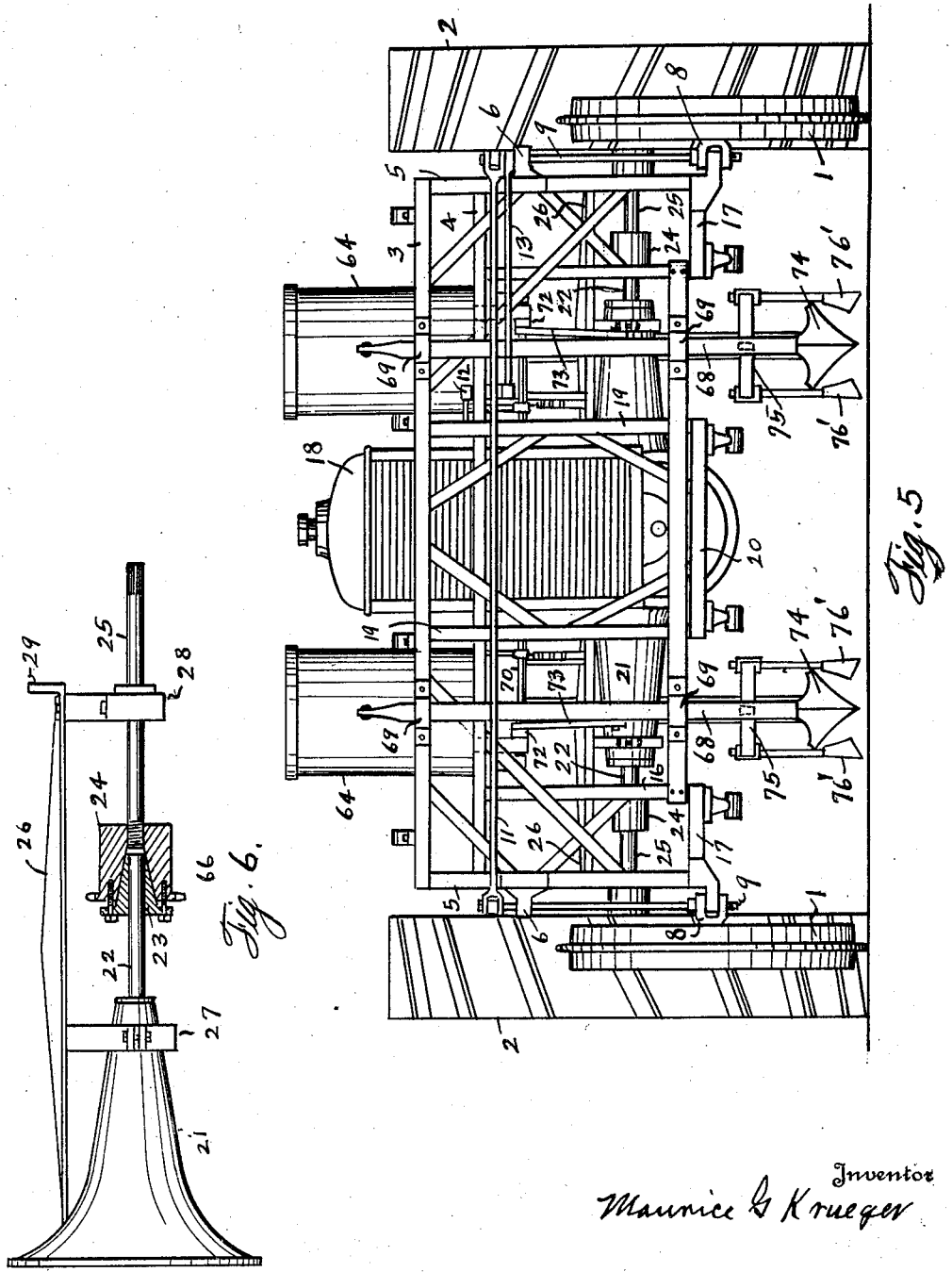

Patented Jan. 6, 1931

1,787,909

UNITED STATES PATENT OFFICE

MAURICE G. KRUEGER, OF NEW ULM, TEXAS

AGRICULTURAL IMPLEMENT

Application filed April 13, 1928. Serial No. 269,665.

This invention relates to new and useful improvements in an agricultural implement.

One object of the invention is to provide an agricultural implement of the character described, and which embodies a novel type of tractor whose front axle is of a novel arched construction, and whose rear axle is of a novel construction and arrangement thereby specially adapting the tractor for use with ground working implements, and for cultivating purposes.

Another object of the invention is to provide a tractor having a novel and flexible form of framework thereby adapting the tractor for use in working and cultivating ground of a rough or uneven surface.

A further feature of the invention resides in a novel type of steering mechanism and novel means for mounting and manipulating the ground working implements carried by the tractor.

With the above and other objects in view this invention has particular relation to certain novel features of construction, operation and arrangement of parts an example of which is given in this specification and illustrated in the accompanying drawings wherein:—

Figure 5 shows a front elevation of the tractor equipped with the planter, and

Figure 6 shows a fragmentary partial sectional view of the rear axle.

Figure 1:
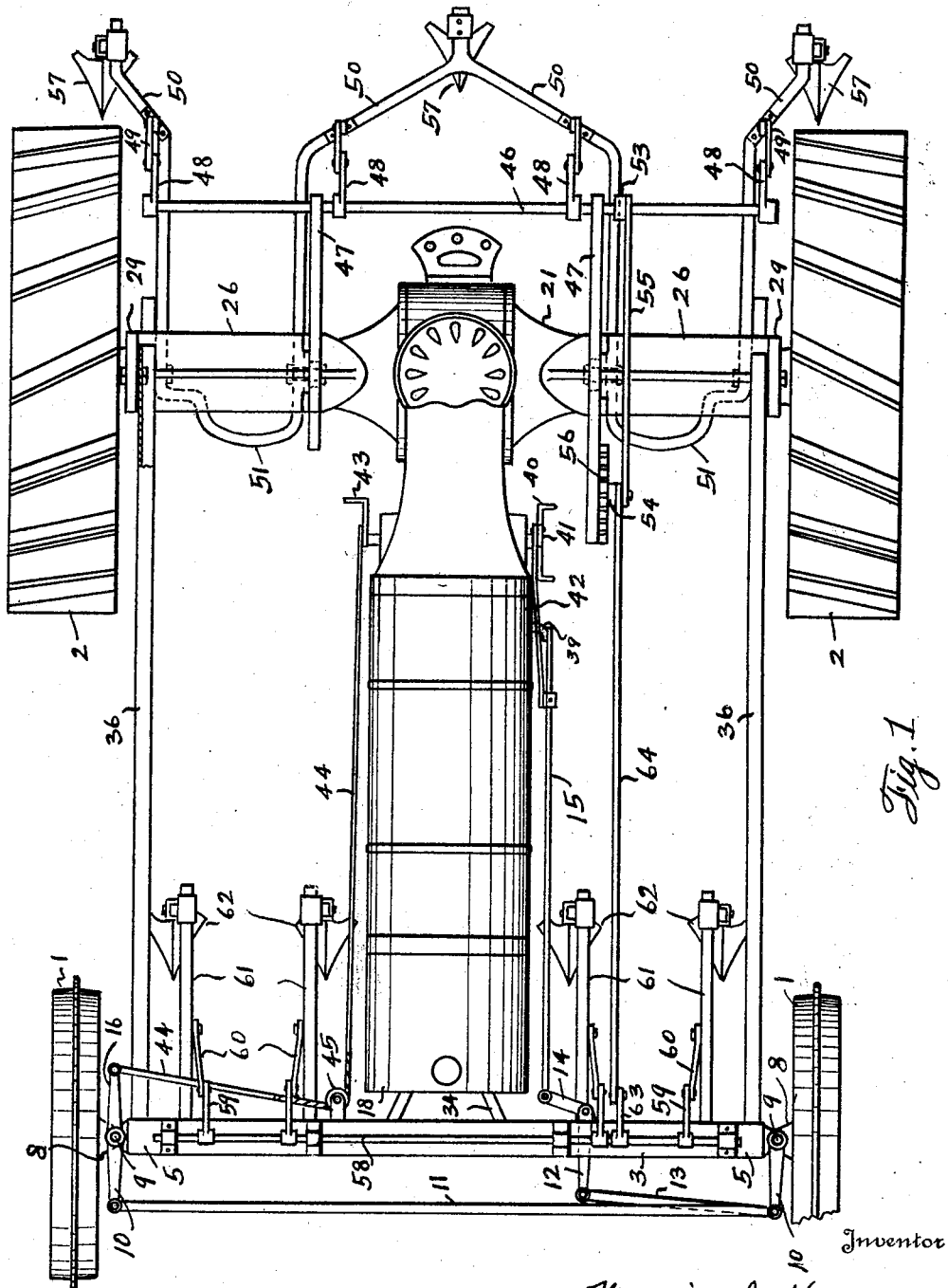
Figure 1 shows a plan view of the implement.
Figure 2:
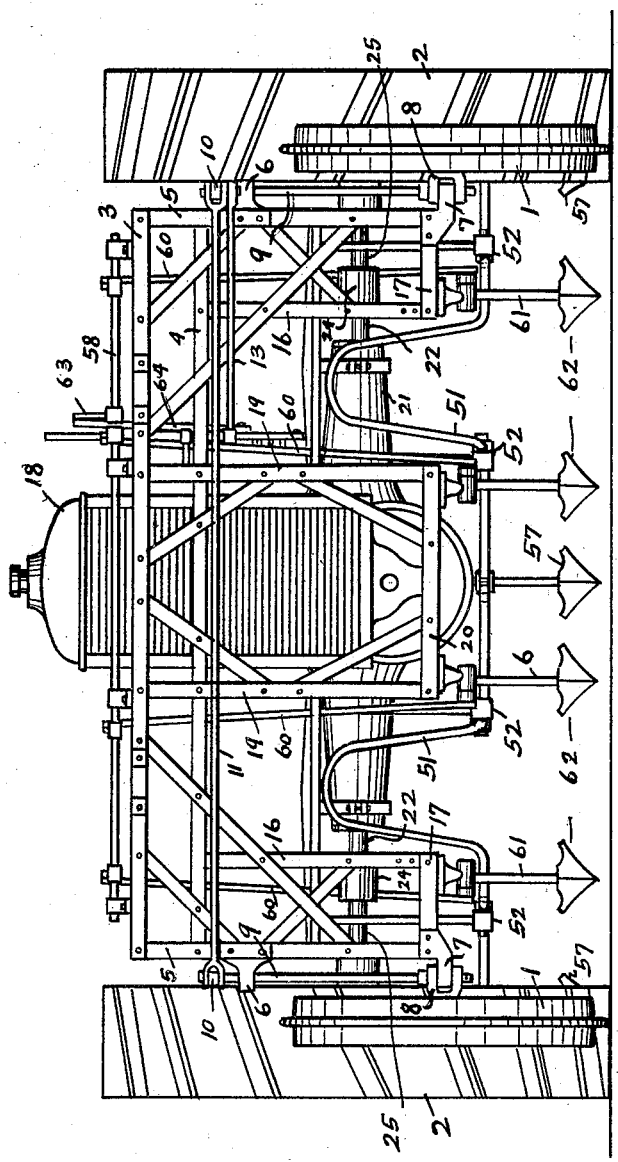
Figure 2 shows a front elevation thereof.
Figure 3:
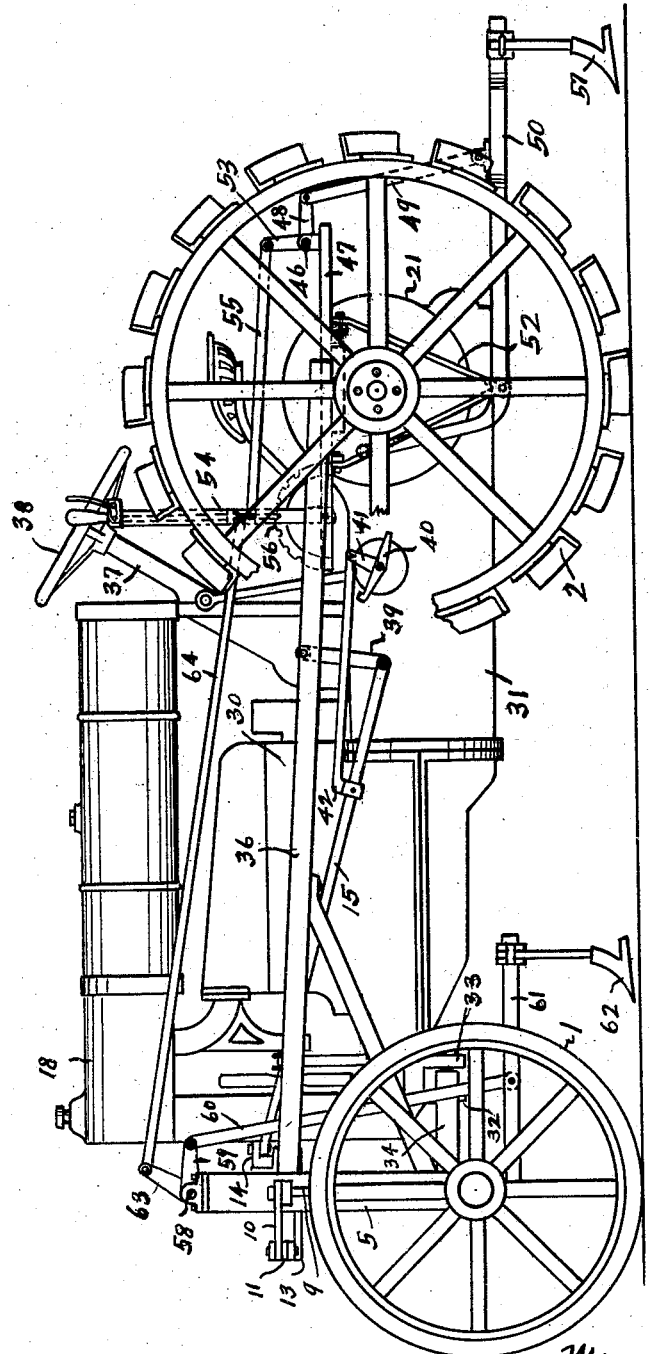
Figure 3 shows a side elevation thereof.

Referring now more particularly to the drawings, wherein like numerals of reference designate similar parts in each of the figures the numerals 1, 1, designate the steering wheels and the numerals 2, 2 designate the tractor wheels.

There is a front axle, which is of a truss like structure comprising the upper and lower cross bars 3, and 4, spaced apart. Secured to and depending from the respective ends of these cross bars are the end bars 5, 5, each having the outwardly extending vertically aligned upper and lower bearings 6, 7. The inner ends of the spindles 8, on which the steering wheels are mounted, are bifurcated and receive between their fingers the corresponding bearings 7. Steering rods 9, 9 are fitted through the respective bearings 6, 7, and also through the fingers of the spindles 8 to which fingers said rods are fixed against relative rotation. The upper ends of the steering rods 9 have the respective forwardly extending arms 10, 10 fixed thereto and a cross bar 11 has its respective ends pivotally connected to the free ends of said arms. There is a pivotally mounted bell crank having a forwardly extending arm 12 whose free end is connected to the free end of one of the arms 10, through the link 13, and the free end of the other arm 14, of said bell crank is pivotally connected to the forward end of the reach rod 15. Extending rearwardly from the other arm 10 and fixed to the corresponding steering rod 9 there is an arm 16.

Spaced inside of the respective end bars 5 are the supplemental bars 16, 16, whose upper ends are anchored to the cross bar 4 and whose lower ends are connected to the lower ends of the corresponding end bars 5 by the cross tie bars 17, 17. On each side of the radiator 18 there is a vertical bar 19 which bars are connected to the upper and lower cross bars 3, 4 and depend therefrom and whose lower ends are connected by a cross bar 20. The bars 16 and 19, on each side are spaced a sufficient distance apart to pass on opposite sides of the rows of plants being cultivated without injuring said plants, provision being thus made for cultivating two rows of plants at a time. The front axle is suitably braced for strength and its novel construction comprises one of the chief improvements of the invention.

The numeral 21 designates the rear axle housing, which encloses the conventional differential mechanism which is connected to and drives the traction wheel shafts 22, 22. Fixed on the outer end of each shaft 22 there is a tapering bushing 23 which fits into a correspondingly shaped bearing in the block 24 and which is bolted to said block and the inner ends of the extension shafts 25, 25 are screwed into the respective blocks 24 and the traction wheels 2 are keyed onto the outer ends of said extension shafts. There are the elongated arch like braces 26, 26. Each brace 26 is secured to a bracket 27, which is clamped around the adjacent end of the housing 21, and the outer end of each brace is supported on the bearing 28 through which the corresponding extension shaft 25 works. The inner end of each brace 26 rests on the adjacent end of the housing 21 and the outer end thereof is upturned forming the lug 29.

The numeral 30 designates a motor extending rearwardly from which is the casting 31, which is supported on the rear axle housing and depending from the front end of the motor case are the spaced bearing members 32, 33. There is a V-shaped clevis 34 the forward ends of whose arms are anchored to the cross bar 20 and this clevis works between the bearing members 32, 33 and is secured therein by the pin 35 which is fitted through aligned bearings in said members and in said clevis. Side members 36, 36 are provided. The forward ends of these side members are connected to the respective end bars 5, of the front axle and their rear ends are pivotally connected to the corresponding lugs 29.

There is the usual steering shaft in the column 37 and attached to the upper end of this shaft is the steering wheel 38. Said shaft 37 is connected, in the usual way, with a depending arm 39 whose free end is pivotally connected to the rear end of the reach rod 15. There is a foot pedal 40, mounted to pivot on a horizontal axis and upstanding from which is an arm 41. A link 42 has one end pivoted to the upper end of the arm 41 and its other end attached to the reach rod 15. The tractor may be steered, in the usual manner, through the steering wheel 38. Opposite the pedal 40, there is another foot pedal 43 and a connecting member 44 connects the free end of the arm 16 with the shank of said pedal 43. A section of the member 44 is flexible and works around a sheave 45 which is connected to the front axle. In steering the vehicle from the steering wheel assistance may be given through the foot pedal 40, in either direction, and through the pedal 43 in one direction.

At the rear of the implement there is a transverse shaft 46, mounted to rotate in transversely aligned bearings 47 and fixed to the shaft 46 are the rearwardly extending arms 48 to the rear ends of which the upper ends of the links 49 are pivotally connected. The lower ends of these links are pivotally connected to the rearwardly extending portions 50 of the share stock. This stock has the forwardly and upwardly curved arches 51, 51 so disposed as to pass over the rows of plants being cultivated. The share stock is pivotally mounted in the hangers 52, 52.

The shaft 46 has an upstanding arm 53 whose free end is connected with the manually operable lever 54, through the link 55. This lever is associated with the conventional rack and dog arrangement 56. Through the manipulation of the lever 54 the shares 57, carried by the rear ends of the portions 50 of the share stock may be elevated and lowered.

Mounted on the front axle there is a transverse shaft 58 having the rearwardly extending arms 59 and the upper ends of the links 60 are pivoted to the free ends of the arm 59. The lower ends of these links 60 are pivoted to the share stocks 61, whose forward ends are pivoted to the front axle. The rear ends of the stocks 61 carry the shares 62. The shaft 58 has an upstanding fixed arm 63 and a link 64 connects the free end of said arm to the lever 54. Through the mechanism described the shares 57 and 62 may be simultaneously elevated and lowered, by the manipulation of the lever 54.

The implement may be readily converted into a planter by removing the rear share stock and shares 57 carried thereby and mounting the conventional planting mechanism 64, 64 thereon, one on each side. Each planter mechanism may be driven through a sprocket chain 65 which operates over a sprocket wheel 66, carried by the corresponding block 24, and over the sprocket wheel 67, of the corresponding planter mechanism, when the implement is used as a planter the front shaft 58, and its associated parts, including the stocks 61 and depending shares, are removed, and the share beams 68, 68 are mounted in the vertically aligned bearings 69, 69 carried by the front axle. There is a rotatably mounted transverse shaft 70 having the upstanding arm 71 fixed thereto, to the free end of which the forward end of the link 64, is pivotally connected. Fixed to the shaft 70 and extending forwardly therefrom are the arms 72, 72 and the links, 73, 73 have their upper ends pivotally connected to the forward ends of the arms 72, and their lower ends adjustably connected to the corresponding beams 68. The shares 74, 74 are attached to the lower ends of the beams 68 and are provided to form the furrows into which the seed are deposited by the planter mechanisms 64. Pivoted to and extending rearwardly from each beam 68 there is the share stock 75 and depending from each stock 75 is the share 76 in front of the planter seed pipe, to keep the furrow open and behind said seed pipe, and depending from the corresponding stock 75, is the pair of shares 76' 76' positioned one on each side of said furrow, and provided to cover the grain, or seed.

Figure 4:
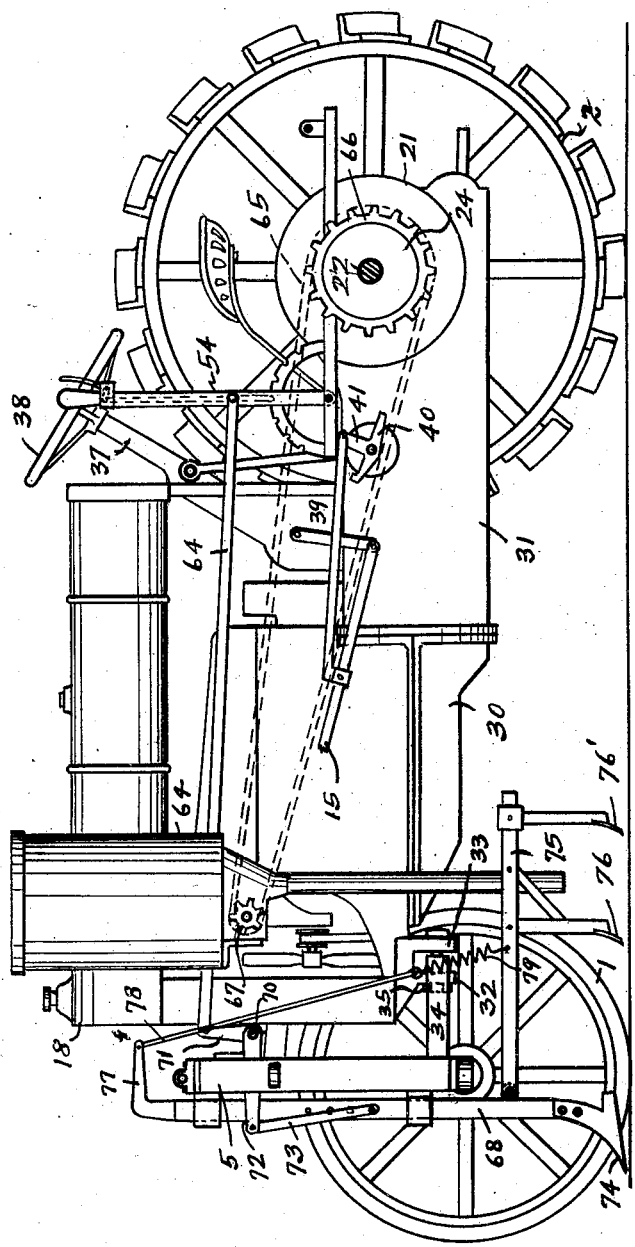
Figure 4 shows a side view of the tractor with planter equipment carried thereby.

The upper end 77 of each beam 68 is rearwardly turned and connected to the corresponding stock 75, through the rod 78 and the coil spring 79, as shown in Figure 4.

The shares 74, 76, 76′ may be elevated and lowered, in an obvious manner through the manipulation of the lever 54.

It is obvious that mechanical changes may be made and equivalents substituted for the parts shown and the right is reserved to make such modifications as may be comprehended within the scope of the appended claims.

What I claim is:—

1. In an agricultural implement an axle formed of upper and lower transverse bars, end bars secured thereto and depending therefrom, supplemental bars secured at their upper ends to the lower cross bar, and depending therefrom, tie bars connecting the lower ends of the supplemental bars to the lower ends of the corresponding end bars, intermediate bars anchored to and depending from said cross bars, a transverse bar connecting the lower ends of said intermediate bars, said intermediate bars being spaced from the corresponding supplemental bars on each side to provide plant spaces between them.

2. An agricultural implement including front, or steering wheels and rear, or tractor, wheels, front and rear axles supported by said wheels, a clevis attached to the front axle and pivotally connected to the motor on a longitudinal axis, side bars fixed to the front axle at their forward ends and whose rear ends have pivotal connections with the rear axle.

3. An agricultural implement including front, or steering wheels and rear, or tractor, wheels, front and rear axles supported by said wheels, a clevis attached to the front axle and pivotally connected to the motor on a longitudinal axis, side bars fixed to the front axle, at their forward ends and whose rear ends have pivotal connections with the rear axle, ground working shares and manually operable means for adjusting the shares vertically.

4. An agricultural implement including front, or steering wheels and rear, or tractor, wheels, front and rear axles, supported by said wheels, a motor attached to the rear axle, a clevis attached to the front axle and pivotally connected to the motor on a longitudinal axis, side bars fixed to the front axle, at their forward ends and whose ends have pivotal connections with the rear axle, and shares depending from the implement.

5. An agricultural implement including a front axle having spaced arches to provide spaces for rows of plants, a rear axle, ground wheels supporting said axles, a share stock mounted to rotate on a transverse axis and having arches aligned with the front axle arches, said stock having rearwardly extending extensions, shares carried by said extensions and manual means for elevating and lowering said shares.

6. An implement of the character described comprising a self propelled, dirigible, vehicle, having a truss like front axle having spaced arches, a rear axle, ground wheels supporting said axles, and ground working shares carried by the front axle, some of which are in front of said front axle and others of which are behind said front axle, all of said shares being in alignment with said arches.

In testimony whereof I have signed my name to this specification.

MAURICE G. KRUEGER.